Figure 1:
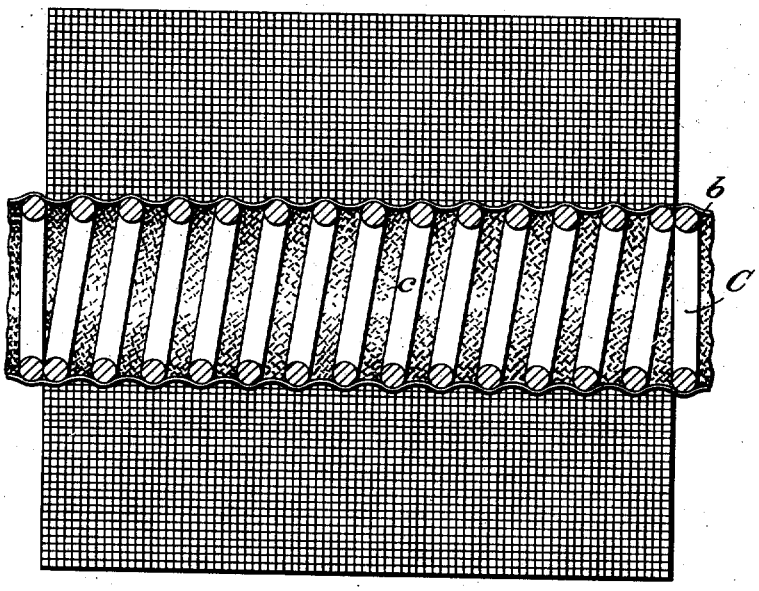

F. H. DANIELL, DEC'D.

M. B. DANIELL, EXECUTRIX.

COP TUBE.

APPLICATION FILED DEC. 27, 1910.

Reissued Mar. 28, 1911.

13,223.

Mary B Daniell, Executrix of the Estate of Frederick H. Daniell Inventor

BY

Foster, Freeman, Watson & Coit

ATTORNEYS

WITNESSES

W. C. Bender

C. S. Brown

UNITED STATES PATENT OFFICE.

FREDERICK H. DANIELL, DECEASED, LATE OF FRANKLIN, NEW HAMPSHIRE, BY MARY B. DANIELL, OF FRANKLIN, NEW HAMPSHIRE, EXECUTRIX, ASSIGNOR TO FRANKLIN PROCESS COMPANY, OF PROVIDENCE, RHODE ISLAND, A CORPORATION OF RHODE ISLAND.

COP-TUBE.

13,223. Specification of Reissued Letters Patent. Reissued Mar. 28, 1911.

Original No. 974,126, dated November 1, 1910, Serial No. 417,419. Application for reissue filed December 27, 1910. Serial No. 599,636.

*To all whom it may concern:*

Be it known that FREDERICK H. DANIELL, deceased, formerly a citizen of the United States, residing at Franklin, in the county of Merrimac and State of New Hampshire, did invent certain new and useful Improvements in Cop-Tubes, of which the following is a specification.

My invention relates to improvements in cop tubes for supporting and retaining yarn, or similar material, during the process of dyeing, oxidizing, mordanting, bleaching, steaming, scouring, washing, or other like treatment, and in transferring processes related to the manufacture and uses of the material.

The object of my invention is to provide a porous, non-collapsible tube, on which the yarn may be wound in the form of a hollow cylinder, cone or ball, in such manner as to be retained in its original conformation to be submitted to dyeing or similar processes, and from which the yarn may be subsequently unwound.

A further and most important feature of my improvement is, to provide a cop tube which will be yieldingly contractible in the direction of its axis, so that when the cops are placed end for end and packed in the dyeing chamber, they may be firmly pressed together to form one continuous and compact mass of yarn with a central opening running its length.

The object of this feature will be evident from the following description of the method of dyeing; but I do not herein claim as my invention, the process or method, the same being the subject matter of a separate application, Serial No. 427,379, filed April 16, 1908.

In dyeing yarn in the cop or package, it is the preferred practice to pump the liquor into the tube by pressure, so as to force it radially outward through the walls of the tube to penetrate and permeate the yarn mass which surrounds the tube. In some cases, to insure complete saturation, it is advantageous to also employ the reverse process of forcing the liquor back again through the cop from the outside, using the tube as a channel for the outflow. In other cases the liquor is forced from the tube radially outward through the package and then drawn back again through the package by suction.

The most practicable and efficient way of dyeing the cops in quantities is to arrange them in groups, with the ends of the cops abutting and their tubes alining to form a channel for the liquor. A convenient method is to provide a pipe of a diameter to fit the internal diameter of the tubes and perforated with openings for the outflow of the liquor. Any convenient number of cops might be placed on the pipe, the latter being connected at one end with the inlet of the dyeing vessel or vat, and having its other end closed to prevent escape of the liquor, except through the cops. It will be obvious that with this arrangement, unless the cops are held firmly against each other, there will be a tendency for the liquor to escape between the ends of the cops, there being less resistance to its outflow at these points than where it must be forced through the yarn. To prevent this, it has been found expedient in practice to press the cops firmly together; as for instance, by the use of flanges or plates adapted to bear on the ends of the cops and arranged to be adjustable along the pipe which supports the cop. It will be understood that two or more cops are placed on the liquor-distributing pipe and the flanges set up against their outer ends. The two flanges are forced toward each other to press the cops tightly together, and then secured in this position by means of collars or other devices. It will be realized that a necessary requisite for this arrangement is a provision for allowing the cop tube to contract in the direction of its axis, in order that it may not resist the end pressure on the cops. It is with this purpose in view that I have devised the following described novel cop tube.

My invention is shown in the accompanying drawings, in which:—

Figure 2:
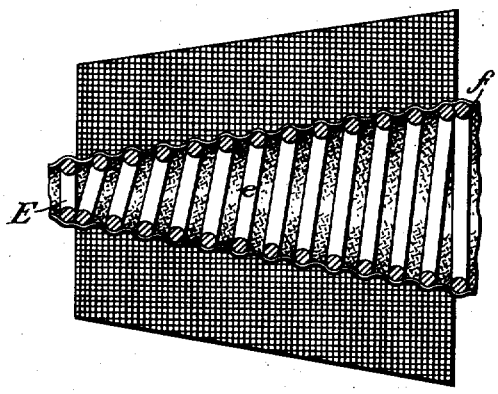
Figure 3:
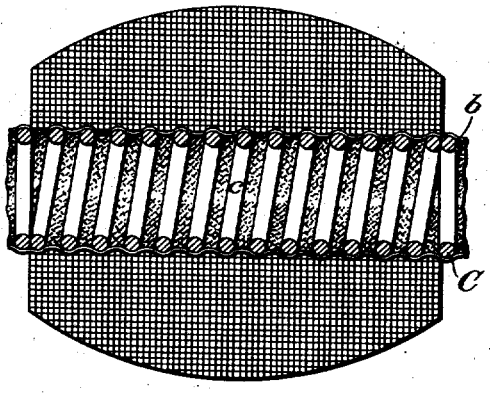

Figure 1, is a sectional view of a cylindrical cop, showing my improved tube applied thereto. Fig. 2, a sectional view of a conical cop, showing how the tube might be adapted to this form of package. Fig. 3, a sectional view of another form of package wound on the tube.

The invention consists primarily of a flexible sleeve *b*, supported in tubular form by a helical coil of wire, or other material, *c*. The sleeve may be of fabric or webbing, either knitted, netted, woven, or braided, and preferably of reticulated character, having meshes sufficiently large to permit a free circulation of the liquor or gas. The supporting coil *c* may be either of round or flat wire, and of such material as will not be disintegrated or corroded by the action of the dyeing chemicals.

As shown in Fig. 1, the wire is coiled openly so as to allow the coils to close up, to permit contraction of the cop tube C along its axis. The coils act to distend the sleeve in tubular shape, to form a cylindrical support for the cop, which can be held rigidly on the winding spindle and which will not collapse from constriction of the winding when the tube is withdrawn from its mandrel. This feature is very important, because it is necessary that the cop be retained in its original conformation in order that the yarn may be unwound freely to deliver at high speed in the processes for which it is prepared by the dyeing. If the cop were allowed to collapse, the coils of winding would become misplaced and tangled, and the delivery of the yarn would be impeded and cause imperfections in the product to which the yarn is supplied. It will be obvious that the wire coils must not be spaced too far apart, or the windings of yarn will cause the sleeve *b* to sag in between the coils *c*, and interfere with the delivery of the yarn in unwinding.

The preferable form of cops for use in the dyeing or other similar processes is that of a cylinder, as shown in Fig. 1, because the mass of yarn is more evenly disposed around the tube than in a cone or ball. It has also been found preferable to have the opening in the cop of considerable diameter, about one third the whole diameter of the package, so that a comparatively large surface of the yarn is exposed to the dyeing liquor, to facilitate its penetration of the whole mass.

The cop tube C is preferably longer than the package and projects slightly beyond the ends of the latter, so that yarn will not fall down over the ends of the tube; but when the packages are placed end for end and compressed, the supporting coil *c* of the tube is contracted, and the end coils forced within the ends of the cop, so as not to separate one cop from another. The shortening of the cop tube as a whole is effected by the closing together of the wire coils, but it is pointed out that the coils *c* contract independently of, and draw up within the sleeve *b*, without shortening the length of said sleeve. In other words, the sleeve *b* does not shift its position in relation to the yarn mass, but when the wire coils are compressed within the confines of the cop, the projecting ends of the sleeve simply collapse and fall down over the outside of the outer coils. This prevents any chafing action on the yarn which would occur if the sleeve were withdrawn bodily into the cop, and it also provides against disarranging the coils of yarn disposed around the sleeve. This latter feature is important, as tending to insure free delivery of the yarn in unwinding from the tube.

Fig. 2 illustrates a cop in the form of a truncated cone, this form being advantageous for some purposes on account of greater ease of delivery of the yarn in unwinding. The cop tube E in this case is of conical form, the coils of wire *e* gradually increasing in diameter from one end to the other, and the sleeve *f* is fashioned to fit this form. In arranging a plurality of these cops for dyeing, the cops will be disposed with the base end of one cone abutting the base end of the next cone, and the small end of this cone abutting the small end of the next cone, and so on. The liquor-distributing pipe must be especially adapted for this form of cop, there being several ways of accomplishing this. The pipe might be made in sections of conical form to fit each cop tube and adapted to be coupled together after the cops had been placed on the pipe sections; or a straight pipe might be used, of a diameter not greater than the opening in the small end of the tube. In this latter case, it would be necessary to employ some form of supporting device for the larger end of the cop tube, such, for instance, as a ring or flange, bored to receive the pipe and fitted to the larger opening in the cop tube. These rings would, of course, be slipped on to the pipe at the same time the cops were being arranged on the pipe.

Fig. 3 shows a cop of approximately spherical formation, but having flattened ends, and this form of package could be handled in the same way as cylindrical cops; that is, arranged with the flat ends abutting.

It will be understood that my invention is a cop tube, and does not comprehend the form or character of cop used thereon, but I have shown several forms of packages for which the tube is adapted. I do not limit myself to any one form of cop, nor to any particular method of winding; the preferable method of winding, however, being by what is known as the universal, or V wind. This system gives absolute regularity in the disposition or lay of the coils of yarn, and, therefore, the most uniform density throughout the yarn mass. In this system of winding, the coils can be spaced accurately, any desired distance apart, so that the cop can be made more or less porous as desired, and the dye liquor will penetrate the whole mass uniformly.

I am aware that cop tubes for dyeing have been heretofore made of flexible fabric, and in some cases the fabric has been stiffened with sizing or starch, to retain its tubular form during the winding. It will be evident, however, that when the cop is subjected to the action of the dyeing liquor, the sizing will become moistened and lose its stiffening qualities, so that the tube will collapse and fail to support the cop in its original form.

In the present invention, I have devised a novel method of combining the fabric tube with means for distending and supporting it in tubular form, to sustain the cops and resist the constriction of the yarn mass wound upon the tube, and to provide for longitudinal contraction of the tube when the cops are pressed together end for end.

It is evident that other means for supporting the sleeve might be provided, such as rings spaced at intervals along its interior, or other similar arrangements which would fall within the scope of this invention. Therefore, I do not limit myself to the exact form of structure shown, but

What I claim is:—

1. In a cop tube for dyeing, or similar purposes, the combination with a sleeve of reticulated fabric, of means for supporting the fabric in tubular form, comprising a helical coil of wire arranged within the sleeve.

2. In a cop tube for dyeing, or similar purposes, the combination of a sleeve of porous fabric, and coils of stiffening material, arranged within the sleeve to distend it in tubular form.

3. In a cop tube, the combination of a helically coiled metallic rib and a flexible, porous sleeve surrounding said rib.

4. In a cop tube, the combination with a flexible, porous sleeve of fabric, of means to support the sleeve in tubular form and to allow it to contract longitudinally of its axis.

5. In a cop tube, the combination with a flexible, porous sleeve of fabric, of a skeleton frame-work supporting the sleeve in tubular form and to allow it to contract longitudinally of its axis.

6. In a cop tube, the combination with a flexible porous sleeve, of a tubular, ribbed frame arranged within the sleeve, said frame adapted to be longitudinally contracted.

7. In a cop tube, the combination of a flexible, tubular, porous sleeve, and means to distend the sleeve, said means capable of longitudinal contraction under pressure, and adapted to expand to the original length when released.

8. In a cop tube, the combination with a flexible, tubular, porous sleeve and a spring element within the sleeve, arranged to distend the sleeve and adapted to be longitudinally contracted against its tension.

9. The within described yarn support for dyeing or similar processes consisting of a tubular frame-work adapted to be compressed longitudinally of its axis and to resist radial compression and having its walls pervious to the flow of liquid or gas.

10. The within described yarn support for dyeing or similar processes consisting of a tubular frame-work comprising spirally wound ribs, the said support adapted to contract longitudinally under end compression and to return to its normal length when released.

11. An improved yarn package for dyeing and other commercial processes consisting of a longitudinally compressible tube having its walls pervious to the flow of liquor or gas, and a yarn mass wound about the tube and adapted to be compressed with the contraction of the tube and to expand with said tube when released from compression.

12. An improved yarn package for dyeing and similar processes consisting of a pervious, tubular support adapted to contract longitudinally of its axis under end compression and to return to its normal length when released from compression, and a yarn mass wound around the support and arranged to be compressed with the compression of the tube and adapted to expand with the expansion of the tube when released from compression.

13. An improved yarn package for use in dyeing and other commercial processes, consisting of a pervious tubular support comprising members assembled to yield longitudinally under end pressure and to extend to their original length when released and a substantially cylindrical yarn mass wound about the support and adapted to be compressed axially with the contraction of said support and to expand under influence of the extension of the support.

14. An improved yarn package for dyeing and other commercial uses consisting of a longitudinally compressible open ended tube adapted to resist radial pressure having its wells pervious to the flow of a fluid, and a yarn mass wound about the tube from end to end and adapted to be compressed with the contraction of the tube and to expand with said tube when released from compression.

15. An article of manufacture comprising yarn wound into a package having substantially flat ends and a central longitudinally compressible pervious support adapted to resist radial pressure and of substantially the same length as the mass of yarn.

MARY B. DANIELL,
*Executrix of the estate of Frederick H. Daniell, deceased.*

Witnesses:
RUTH ADAMS,
WILLIAM B. DANIELL.